(12) United States Patent
Spay et al.

(10) Patent No.: US 10,883,970 B2
(45) Date of Patent: Jan. 5, 2021

(54) SCANNER MAGNETIC WHEEL SYSTEM FOR CLOSE TRACTION ON PIPES AND PIPE ELBOWS

(71) Applicant: OLYMPUS AMERICA INC., Center Valley, PA (US)

(72) Inventors: Benjamin Spay, Quebec (CA); Sylvain Sauvageau, Levis (CA)

(73) Assignee: Olympus America Inc., Center Valley, PA (US)

( * ) Notice: Subject to any disclaimer, the term of this patent is extended or adjusted under 35 U.S.C. 154(b) by 95 days.

(21) Appl. No.: 16/169,050

(22) Filed: Oct. 24, 2018

(65) Prior Publication Data

US 2019/0128854 A1    May 2, 2019

Related U.S. Application Data

(60) Provisional application No. 62/578,077, filed on Oct. 27, 2017.

(51) Int. Cl.
| | | |
|---|---|---|
| *G01N 29/265* | (2006.01) | |
| *G01N 29/04* | (2006.01) | |
| *G01N 29/26* | (2006.01) | |
| *G01N 29/22* | (2006.01) | |
| *G01N 29/24* | (2006.01) | |

(52) U.S. Cl.
CPC ....... *G01N 29/2493* (2013.01); *G01N 29/041* (2013.01); *G01N 29/043* (2013.01); *G01N 29/221* (2013.01); *G01N 29/262* (2013.01); *G01N 29/265* (2013.01); *G01N 2291/044* (2013.01); *G01N 2291/106* (2013.01); *G01N 2291/2626* (2013.01); *G01N 2291/2634* (2013.01)

(58) Field of Classification Search
CPC .. G01N 29/041; G01N 29/043; G01N 29/221; G01N 29/2493; G01N 29/262; G01N 29/265; G01N 2291/2626; G01N 2291/044; G01N 2291/106; G01N 2291/2634
USPC .......................................................... 73/639
See application file for complete search history.

(56) References Cited

U.S. PATENT DOCUMENTS

| | | | | |
|---|---|---|---|---|
| 5,007,291 A | * | 4/1991 | Walters ................ | G01N 29/043 226/176 |
| 5,619,423 A | * | 4/1997 | Scrantz .............. | G01N 29/2412 324/220 |
| 5,623,107 A | * | 4/1997 | Patterson, Sr. .... | G01N 29/0645 73/865.8 |

(Continued)

FOREIGN PATENT DOCUMENTS

| | | | |
|---|---|---|---|
| CN | 201548530 | * | 8/2010 |
| CN | 207490623 | * | 12/2017 |

*Primary Examiner* — Jacques M Saint Surin
(74) *Attorney, Agent, or Firm* — Schwegman Lundberg & Woessner, P.A.

(57) ABSTRACT

An ultrasound scanner assembly for inspection of pipes and pipe elbows comprises a frame and a wedge. Four wheels are attached to the frame, there being a front wheel pair and a rear wheel pair. In order to maintain stable positioning of the probe assembly while scanning, the wheels are magnetic, thereby establishing a magnetic stabilizing force between the wheels and the pipe or pipe elbow. The magnetic stabilizing force is larger for pipes of small diameter than for pipes of large diameter.

22 Claims, 8 Drawing Sheets

(56) References Cited

U.S. PATENT DOCUMENTS

| | | | |
|---|---|---|---|
| 6,311,558 B1* | 11/2001 | Clark | G01L 1/12 |
| | | | 73/597 |
| 9,347,851 B2* | 5/2016 | Hart, Jr. | G01N 29/069 |
| 2009/0193899 A1* | 8/2009 | Panetta | G01N 29/30 |
| | | | 73/622 |

* cited by examiner

SCANNER MAGNETIC WHEEL SYSTEM FOR CLOSE TRACTION ON PIPES AND PIPE ELBOWS

CROSS-REFERENCE TO RELATED APPLICATIONS

This application claims the benefit and priority of U.S. Provisional patent application Ser. No. 62/578,077 filed Oct. 27, 2017, entitled SCANNER MAGNETIC WHEEL SYSTEM FOR CLOSE TRACTION ON PIPES AND PIPE ELBOWS, the entire disclosure of which is incorporated herein by reference.

FIELD OF THE INVENTION

The invention relates in general to non-destructive test and inspection of pipes and pipe elbows with ultrasound and, in particular, to an ultrasound scanner assembly suited for such inspection.

BACKGROUND OF THE INVENTION

Inspection of pipe elbows is a difficult problem because of the constraints imposed by the elbow geometry. One solution is to remove the elbow for inspection, for example by X-ray techniques. However, in situ inspection techniques are clearly preferred.

Ultrasound inspection of pipe elbows is performed in current practice, but such inspection is performed only with a single element ultrasound probe. Inspection with a single element probe is a lengthy and tedious process, and there is generally no capability to map the location of defects in an inspected elbow.

There therefore exists a need for an ultrasound inspection device which uses a linear phased array probe capable of performing defect mapping.

SUMMARY OF THE INVENTION

Accordingly, it is a general objective of the present disclosure to provide an ultrasound array probe assembly capable of reliably mapping defects at a pipe elbow.

This and other objectives are achieved by means of an ultrasound scanner assembly comprising a frame and at least one scanner wheel rotatably attached to the frame, at least one of the at least one scanner wheel comprising a magnetized component, the at least one wheel configured to exert a first magnetic attractive force at times when the at least one scanner wheel is in contact with a first pipe surface and to exert a second magnetic attractive force at times when the at least one scanner wheel is in contact with a second pipe surface.

DETAILED DESCRIPTION OF PREFERRED EMBODIMENT

The process of mapping defects in a pipe elbow is difficult to carry out for the following reasons:

1) The probe must be moved with reliable positioning over all parts of the pipe elbow, namely the inside corner, the outside corner and the intermediate region.
2) The direction of the probe array length needs to remain substantially perpendicular to the central axis of the elbow throughout each axial scan parallel to the central axis.
3) The distance between the probe and the pipe surface (the couplant path length) must remain reasonably constant throughout the axial scan.

Figure 1:
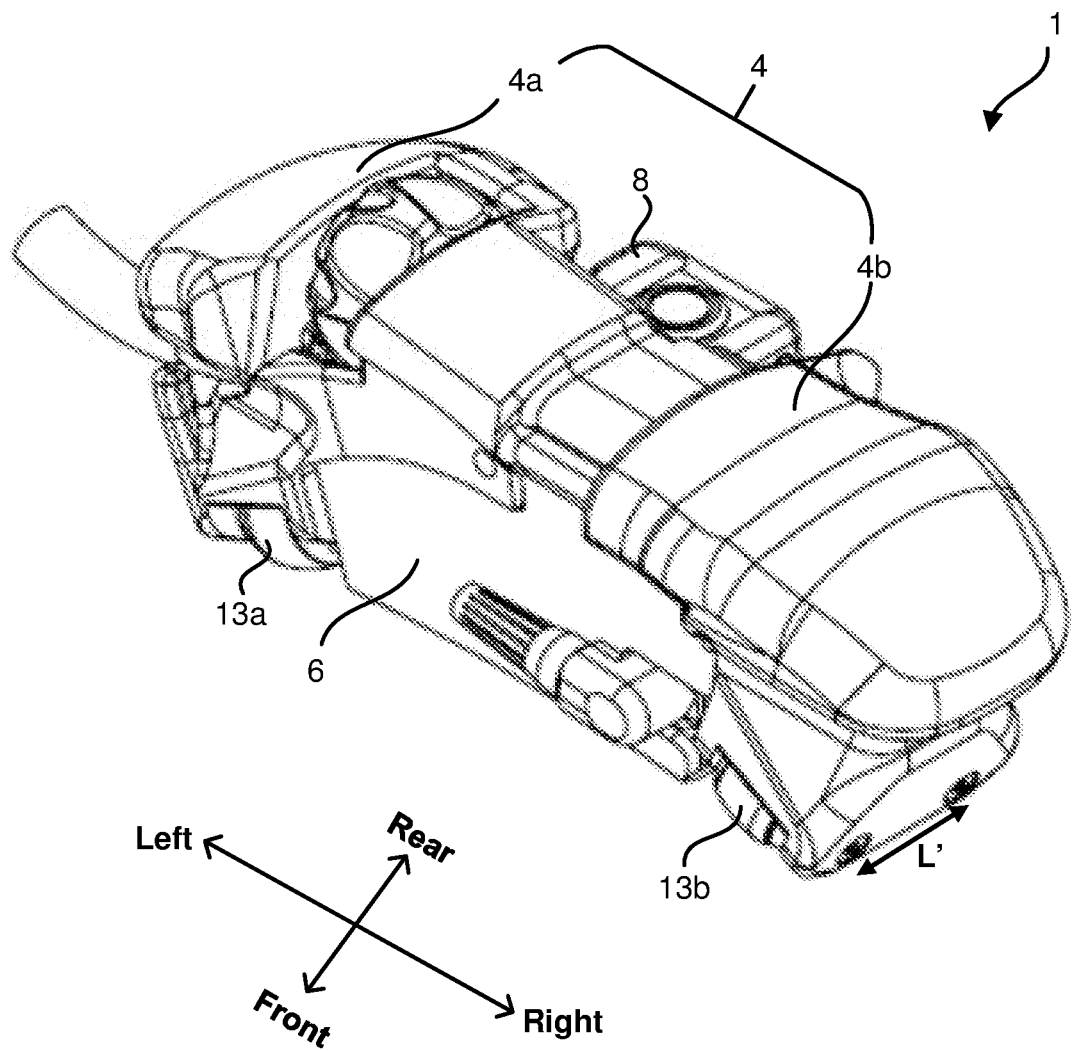
FIG. 1 is an isometric diagram of an ultrasound scanner assembly according to the present disclosure.

FIG. 1 shows an isometric view of an ultrasound scanner assembly 1. FIG. 1 also shows a directional key, showing use throughout this disclosure of conventions for left, right, front and rear directions. Note that use of the directional key is only for purposes of clear exposition and is in no way intended to be restrictive or to limit the scope of the present disclosure.

Figure 2:
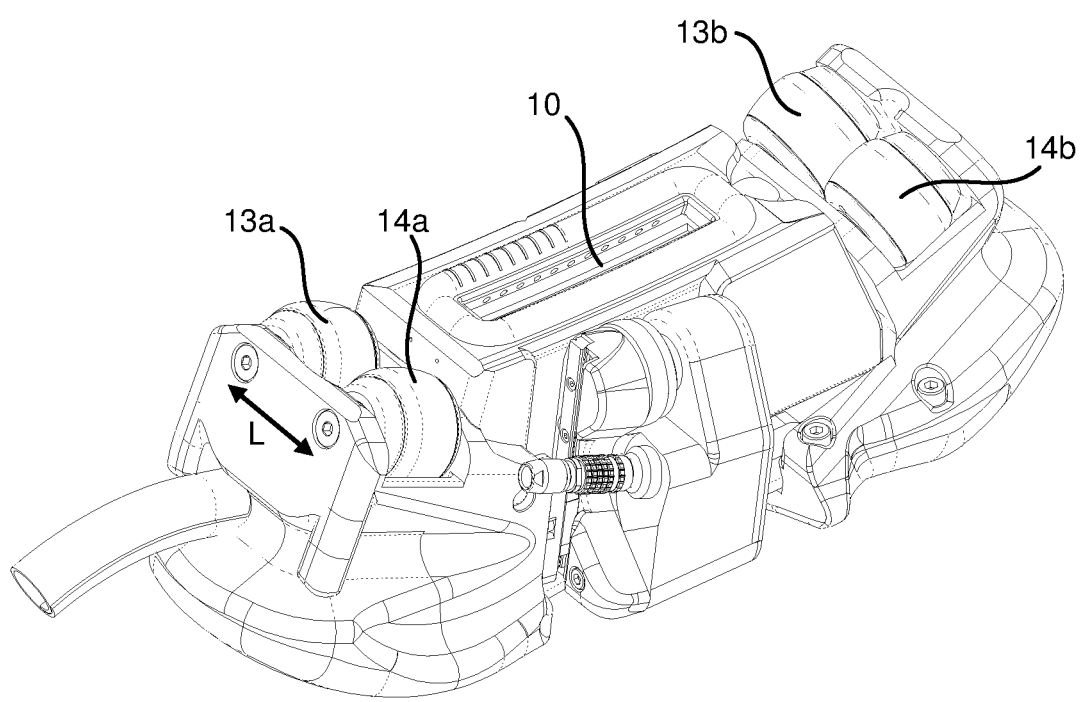
FIG. 2 is an underside view of the ultrasound scanner assembly according to the present disclosure.

As shown in FIG. 1, ultrasound scanner assembly 1 comprises a wedge 6, a frame 4 and an encoder assembly 8. Frame 4 comprises a left frame piece 4a and a right frame piece 4b. FIG. 2 is an underside view of ultrasound scanner assembly 1 showing wheels 13a, 13b, 14a and 14b, and the location of an acoustic module 10. Acoustic module 10 comprises a linear probe array having ultrasonic elements arrayed in a longitudinal direction, the ultrasonic elements being configured to emit and/or receive ultrasonic energy. Acoustic module 10 is preferably flexible in the longitudinal direction.

Referring to FIGS. 1 and 2, it is seen that frame 4 rides on four rotatable wheels: a front left wheel 13a, a front right wheel 13b, a rear left wheel 14a and a rear right wheel 14b. There is a first wheel axial separation L between wheels 13a and 14a, and a second wheel axial separation L' between wheels 13b and 14b. Wheel axial separations L and L' are designed to be as small as possible, and in an embodiment L is equal to L'. In a further embodiment, L and L' are both less than four inches and, in a preferred embodiment, L and L' are both less than two inches. Note that when ultrasound scanner assembly 1 is in use, wheel axial separations L and L' are oriented substantially parallel to the central axis of the pipe or pipe elbow.

Use of four wheels on ultrasound scanner assembly 1, with two wheels on each side of acoustic module 10, and small wheel axial separations L and L', has the following advantages for scanning a pipe elbow:

1. It is important that during the scan the orientation of the longitudinal direction of acoustic module 10 should remain closely concentric with the central axis of the elbow. In an embodiment, the tolerance for concentricity may be ±3°. Small wheel axial separations L and L' allow such tolerance of concentricity to be more easily maintained.

2. The distance between the emitting surface of acoustic module 10 and the pipe surface (i.e. the couplant path length) should be kept constant throughout the scan. Small wheel axial separations L and L' allow a constant couplant path length to be more easily maintained.

3. Use of two wheels on each side of acoustic module 10 allows the scanner assembly to be easily manipulated over all parts of the pipe elbow, namely the inside corner, the outside corner and intermediate locations.

Figure 3A:
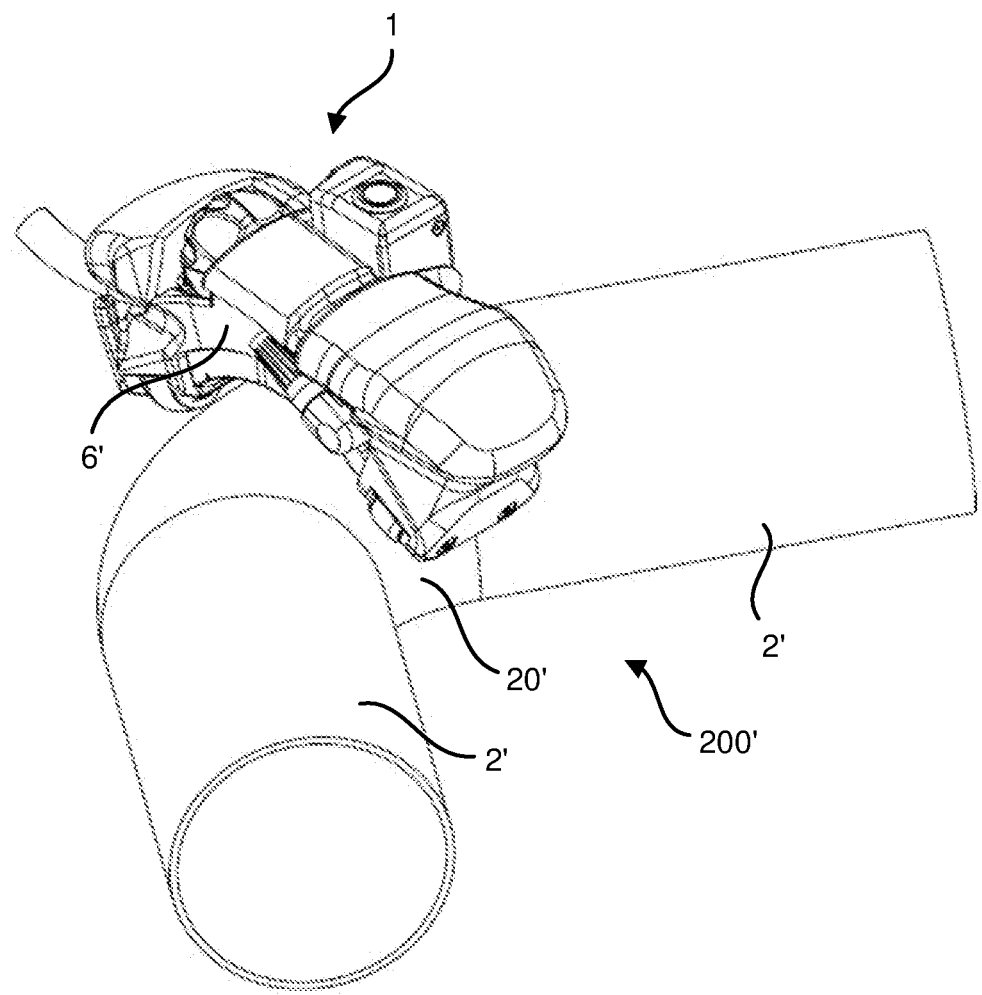
FIG. 3A is a diagram of the ultrasound scanner assembly located on a pipe elbow.
Figure 3B:
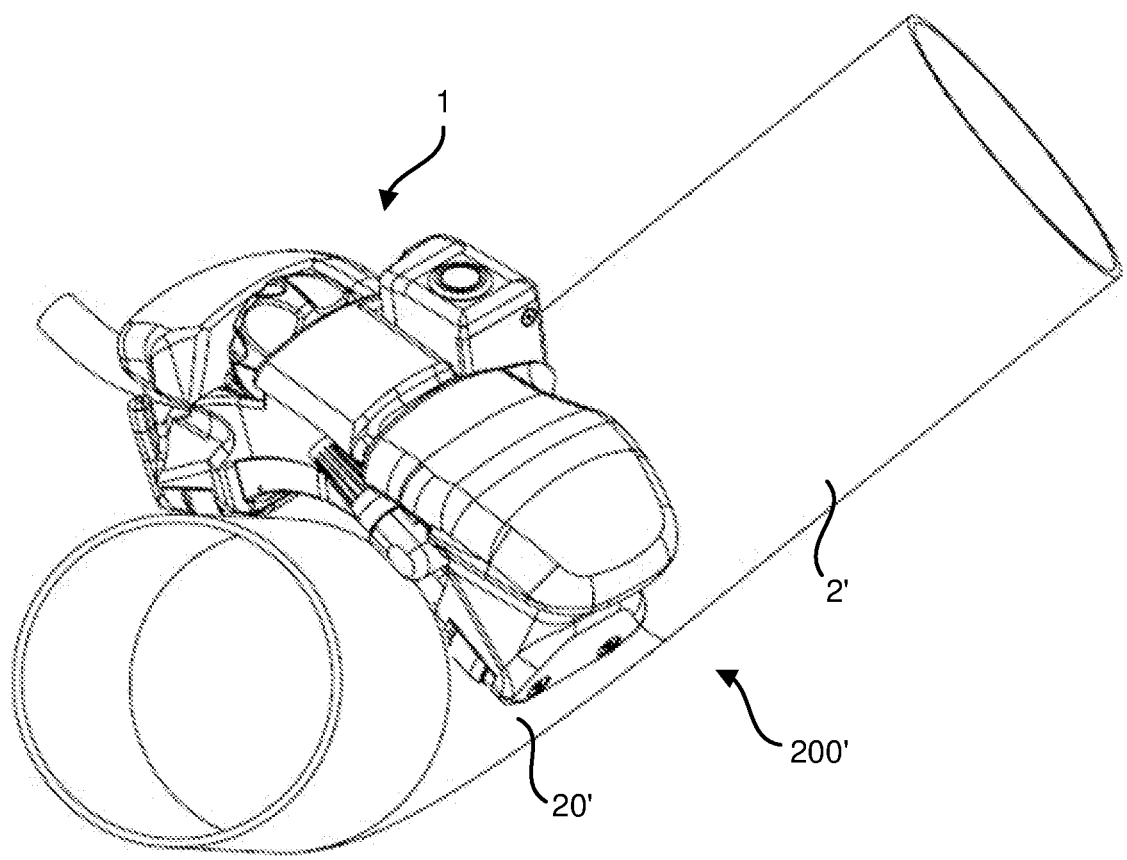
FIG. 3B is a diagram of the ultrasound scanner assembly located on an inside corner of a pipe elbow.
Figure 3C:
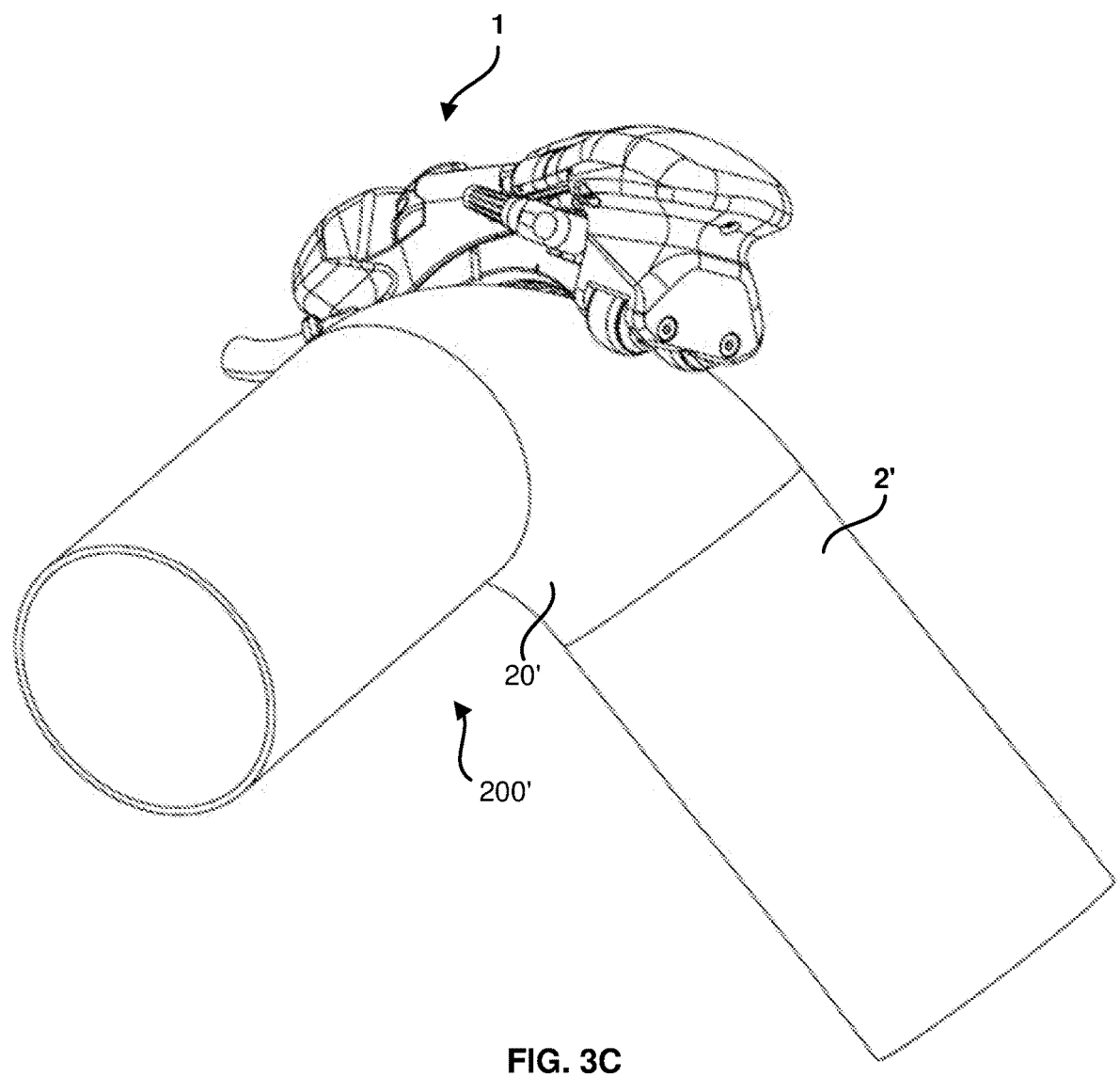
FIG. 3C is a diagram of the ultrasound scanner assembly located on an outside corner of a pipe elbow.

By exchanging integrated wedge 6, ultrasound scanner assembly 1 may be configured for different pipe diameters ranging from a two-inch diameter pipe to a flat surface. FIG. 3A shows ultrasound scanner assembly 1 located on a pipe assembly 200' comprising two pipes 2' joined by a pipe elbow 20', wherein ultrasound scanner assembly 1 comprises a wedge 6' configured for the diameter of pipe assembly 200'. FIG. 3B shows ultrasound scanner assembly 1 located on the inside corner of pipe elbow 20' of pipe assembly 200', and FIG. 3C shows ultrasound scanner assembly 1 located on the outside corner of pipe elbow 20' of pipe assembly 200'.

When in use, ultrasound scanner assembly 1 is scanned from front to rear in an axial scanning direction which is substantially parallel to the pipe central axis. Note that the pipe central axis may be a straight line in the case of a straight pipe, but may be curved in the case of a pipe elbow. At completion of a scan, the user moves ultrasound scanner assembly 1 a circumferential pipe direction, either from left to right or from right to left, such that, at the end of the circumferential move, ultrasound scanner assembly 1 is located at the next circumferential location for axial scanning. The procedure of moving the scanner to the next circumferential location is referred to as "scan indexation".

It is an important aspect of the present disclosure that, during both axial scanning and scan indexation, ultrasound scanner assembly 1 is held in contact with the pipe by a magnetic attractive force exerted by at least one of wheels 13a, 13b, 14a and 14b. A wheel which is capable of exerting a magnetic attractive force is referred to hereinafter as a magnetic wheel.

Figure 4:
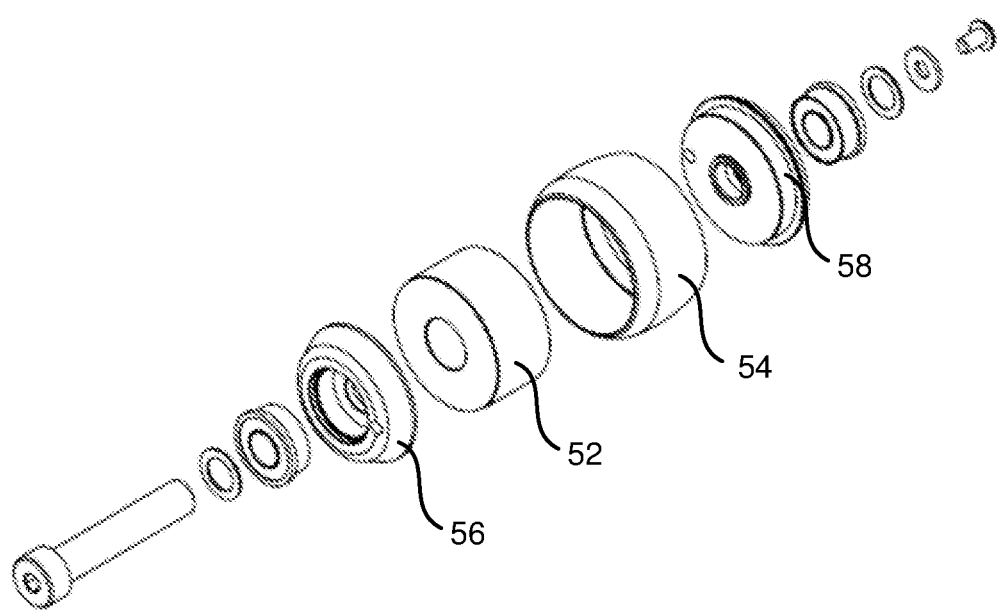
FIG. 4 is an exploded view of a magnetic wheel according to the present disclosure.

FIG. 4 is an exploded view of a magnetic wheel. Some or all of wheels 13a, 13b, 14a, 14b may be magnetic wheels. In a preferred embodiment, all of wheels 13a, 13b, 14a, 14b are magnetic wheels, and all have identical construction. As shown in FIG. 4, a magnetic wheel comprises a wheel magnet 52, a plastic sleeve 54, a lesser flange 56 and a greater flange 58. Plastic sleeve 54 encloses and protects wheel magnet 52. Lesser flange 56 and greater flange 58 are both made of magnetizable material. In an embodiment, the magnetizable material may be steel, but any other magnetizable material may be used, and lesser flange 56 and greater flange 58 may be made from different magnetizable materials. Wheel magnet 52 is in contact with both lesser flange 56 and greater flange 58, and induces magnetism into both flanges, so that when either one or both of lesser flange 56 or greater flange 58 is close to or in contact with a magnetic material such as a steel pipe, an attractive magnetic force exists between the magnetic wheel and a pipe made of magnetic material.

Note that wheel magnet 52, lesser flange 56 and greater flange 58 are magnetized components within a magnetic wheel. Wheel magnet 52 is preferably a permanent magnet made of permanently magnetizable material, and lesser flange 56 and greater flange 58 are magnetized by magnetic induction from wheel magnet 52. In an alternative embodiment, wheel magnet 52, lesser flange 56 and/or greater flange 58 may be magnetized by application of electric current to one or more coils contained within a magnetic wheel.

As shown in FIG. 4, greater flange 58 may be thicker and may comprise a larger mass of magnetizable material than lesser flange 56. Consequently, the magnetic force on a steel pipe due to greater flange 58 is larger than the magnetic force due to lesser flange 56. In an alternative embodiment, a higher magnetic force from greater flange 58 may be achieved by making greater flange 58 of a magnetizable material with higher magnetic permeability than the magnetizable material of flange 56.

Figure 5A:
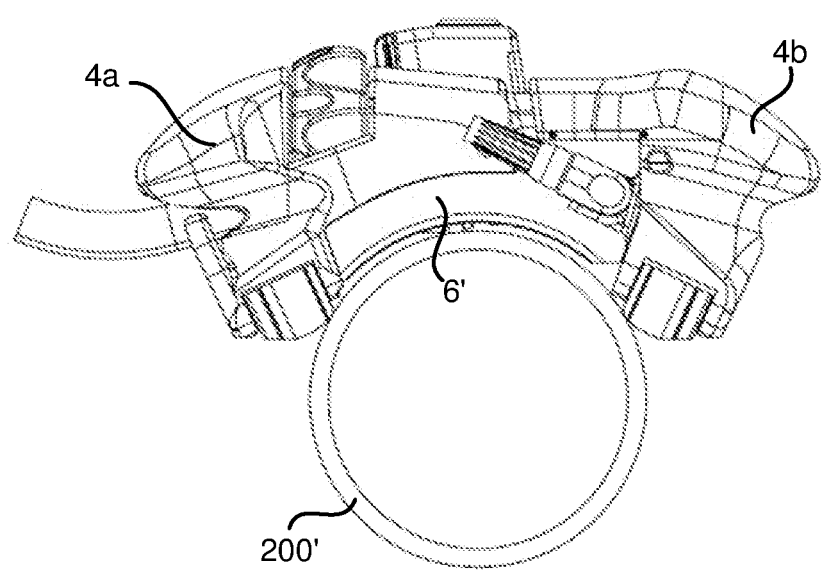
FIG. 5A is a side view of the ultrasound scanner assembly located on a 4.5 inch pipe.
Figure 5B:
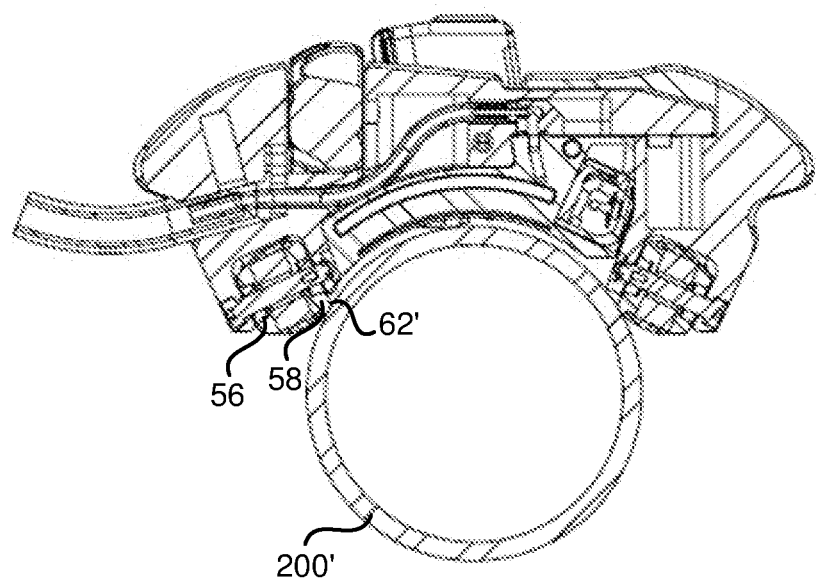
FIG. 5B is a side section view of the ultrasound scanner assembly located on a 4.5 inch pipe.

FIGS. 5A and 5B show, respectively, a side view and a side section view of ultrasound scanner assembly 1 having a wedge 6' configured for 4.5 inch pipe assembly 200'. Each of the four wheels of ultrasound scanner assembly 1 makes contact with 4.5 inch pipe assembly 200' at a respective contact surface 62'. In the case of 4.5 inch pipe assembly 200', contact surface 62' corresponds to a contact location between greater flange 58 and 4.5 inch pipe assembly 200'. In the illustrated embodiment, greater flange 58 directly contacts the surface of any pipe having diameter between 2 inches and 6 inches. For pipes with a diameter larger than 6 inches, plastic sleeve 54 is in contact with the pipe surface.

Figure 6A:
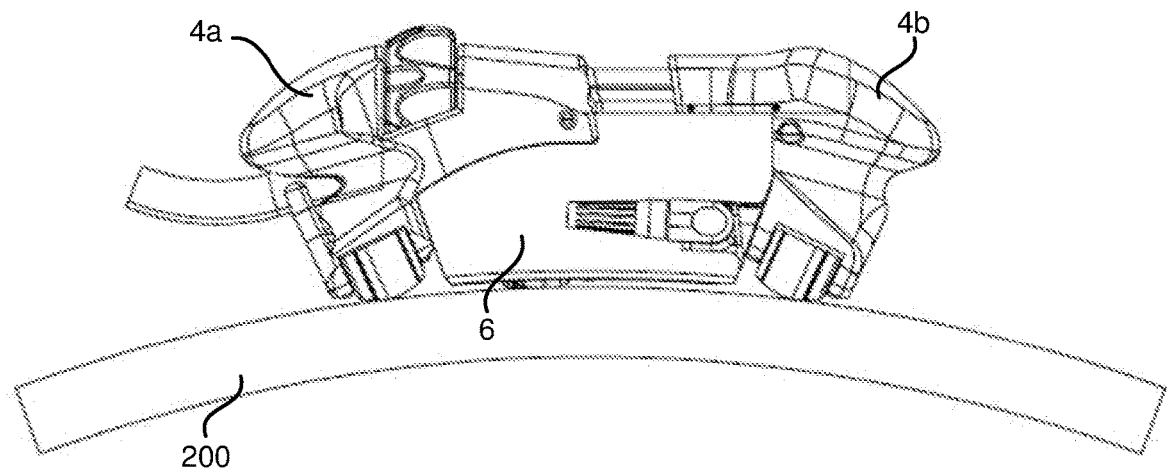
FIG. 6A is a side view of the ultrasound scanner assembly located on a 48 inch pipe.
Figure 6B:
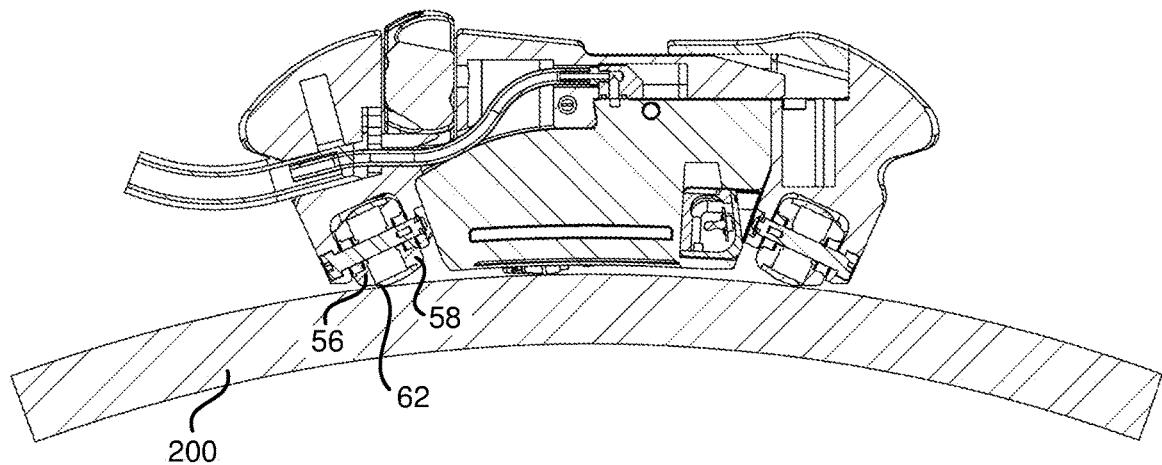
FIG. 6B is a side section view of the ultrasound scanner assembly located on a 48 inch pipe.

Similarly, FIGS. 6A and 6B show, respectively, a side view and a side section view of ultrasound scanner assembly 1 having a wedge 6 configured for 48 inch pipe assembly 200. Each of the four wheels of ultrasound scanner assembly 1 makes contact with 48 inch pipe assembly 200 at a respective contact surface 62 which corresponds to a contact location between plastic sleeve 54 and 48 inch pipe assembly 200. However, at contact surface 62, lesser flange 56 is much closer to the pipe surface than greater flange 58. Therefore the attractive magnetic force between the wheels and the pipe is larger at times when ultrasound scanner assembly 1 is being used on 4.5 inch pipe assembly 200' than at times when ultrasound scanner assembly 1 is being used on 48 inch pipe assembly 200. Thus it can be seen that the magnetic force is largest for pipes with a diameter between 2 inches and 6 inches, when greater flange 58 is in direct contact with the pipe surface. For pipes with diameter larger than 6 inches, contact is between plastic sleeve 54 and the pipe surface. However, as the pipe diameter increases, greater flange 58 becomes further from the pipe surface and lesser flange 56 becomes closer to the pipe surface. Consequently, as the pipe diameter increases from 6 inches to a flat surface (infinite diameter), the magnetic force between the wheels and the pipe continuously decreases.

It is an important aspect of the present disclosure that the magnetic force between the wheels and the pipe continuously decreases as the pipe diameter increases. Each of the wheels of ultrasound scanner assembly 1 comprises a greater flange providing a larger magnetic force and a lesser flange providing a smaller magnetic force. The larger magnetic force is operative for smaller diameter pipes such as 4.5 inch pipe assembly 200' where the small pipe diameter increases the risk of ultrasound scanner assembly 1 slipping during scanning or indexation. The smaller force is operative for larger diameter pipes such as 48 inch pipe 200 where location of ultrasound scanner assembly 1 is more stable on the larger pipe. This arrangement allows stable axial scanning and circumferential indexation for longitudinal pipes and elbows of both small and large diameter.

Although the present invention has been described in relation to particular embodiments thereof, it can be appreciated that various designs can be conceived based on the teachings of the present disclosure, and all are within the scope of the present disclosure.

What is claimed is:

1. A scanner assembly configured for non-destructive test and inspection (NDT/NDI), the scanner assembly comprising:
a frame; and,
at least one scanner wheel rotatably attached to the frame, at least one of the at least one scanner wheel comprising a magnetic material, the at least one scanner wheel configured to exert a first magnetic attractive force when the at least one scanner wheel is in contact with a first pipe having a first diameter, and to exert a different, lesser second magnetic attractive force when the at least one scanner wheel is in contact with a second pipe having a different second diameter that is greater than the first diameter.

2. The scanner assembly of claim 1, wherein the at least one scanner wheel comprises at least one wheel magnet, and wherein the wheel magnet is permanently magnetized.

3. The scanner assembly of claim 1, wherein the at least one scanner wheel comprises at least one electric coil configured to magnetize the magnetic material.

4. The scanner assembly of claim 1, wherein the scanner assembly is an ultrasound scanner assembly.

5. The scanner assembly of claim 1, wherein the at least one scanner wheel comprises one scanner wheel amongst at least four scanner wheels.

6. The scanner assembly of claim 1, wherein the at least one scanner wheel further comprises a greater flange and a lesser flange, wherein the greater flange is made of a first magnetic material and the lesser flange is made of a second magnetic material, and wherein a first magnetic permeability of the greater flange is different than a second magnetic permeability of the lesser flange.

7. The scanner assembly of claim 1, wherein the at least one scanner wheel further comprises a greater flange and a lesser flange each comprising a common magnetic material, and wherein the greater flange comprises a greater mass of the common magnetic material and the lesser flange comprises a lesser mass of the common magnetizable material.

8. The scanner assembly of claim 6, wherein the first magnetic material has a greater magnetic permeability and the second magnetic material has a lesser magnetic permeability.

9. The scanner assembly of claim 1, further comprising an acoustic module having an emitting surface configured to emit ultrasonic energy into a pipe surface and to receive echo signals from the pipe surface.

10. The scanner assembly of claim 1, further comprising a first wedge configured for scanning via a first surface of the first pipe and a second wedge configured for scanning via a second surface of the second pipe, the first wedge and the second wedge configured to be interchangeably fastened to the frame.

11. A scanning system configured for non-destructive test and inspection (NDT/NDI), the scanning system comprising:
a scanner assembly comprising:
a frame; and,
at least one scanner wheel rotatably attached to the frame, at least one of the at least one scanner wheel comprising a magnetic material, the at least one scanner wheel configured to exert a magnetic attractive force to stabilize the scanner assembly against a pipe assembly, the magnetic attractive force varying in dependence on a diameter of the pipe assembly when the at least one scanner wheel is in contact with a pipe surface of the pipe assembly.

12. The scanning system of claim 11, wherein the at least one scanner wheel comprises at least one wheel magnet, and wherein the wheel magnet is permanently magnetized.

13. The scanning system of claim 11, wherein the at least one scanner wheel comprises at least one electric coil configured to magnetize the magnetic material.

14. The scanning system of claim 11, wherein the at least one scanner wheel is configured to exert a first magnetic attractive force when the at least one scanner wheel is in contact with a first pipe surface of a first pine having a first diameter defining a first distance between the first pipe surface and the magnetic material, and the at least one scanner wheel is configured to exert a second magnetic attractive force when the at least one scanner wheel is in contact with the second pipe surface of a second pipe having a different second diameter defining a different second distance between the second pine surface and the magnetic material, and wherein the first magnetic attractive force is greater than the second magnetic attractive force.

15. The scanning system of claim 11, wherein the scanner assembly is an ultrasound scanner assembly.

16. The scanning system of claim 11, wherein the at least one scanner wheel comprises one scanner wheel amongst at least four scanner wheels, and wherein the four scanner wheels are arranged for contact with the pipe surface to facilitate a scanning motion of the scanner assembly in an axial scanning direction parallel to a central axis of the pipe assembly.

17. The scanning system of claim 16, wherein the four scanner wheels comprise a first wheel pair and a second wheel pair, and wherein the first wheel pair is on a first side of the central axis during the scanning motion and the second wheel pair is on a second side of the central axis during the scanning motion.

18. The scanning system of claim 11, wherein the pipe assembly comprises a pipe.

19. The scanning system of claim 11, wherein the pipe assembly comprises an elbow comprising a joining of at least two pipes.

20. The scanning system of claim 11, wherein the pipe assembly is comprises a magnetic material.

21. The scanning system of claim 11, wherein the at least one scanner wheel further comprises a greater flange and a lesser flange, wherein the greater flange and the lesser flange are made of a magnetic material, and wherein an attractive magnetic force provided by the greater flange is larger than an attractive magnetic force provided by the lesser flange.

22. The scanning system of claim 21, wherein during scanning of first pipe having a first diameter, the at least one scanner wheel is configured to be in contact with a first surface of the first pipe at a first contact point placing the greater flange is in closer proximity to the first contact point than the lesser flange, and wherein during scanning of a second pipe having a different second diameter, the at least one scanner wheel is configured to be in contact with a second surface of the second pipe at a second contact point placing the lesser flange is in closer proximity to the second contact point than the greater flange.

* * * * *

UNITED STATES PATENT AND TRADEMARK OFFICE
CERTIFICATE OF CORRECTION

PATENT NO. : 10,883,970 B2
APPLICATION NO. : 16/169050
DATED : January 5, 2021
INVENTOR(S) : Spay et al.

Page 1 of 1

It is certified that error appears in the above-identified patent and that said Letters Patent is hereby corrected as shown below:

In the Claims

In Column 6, Line 15, in Claim 14, delete "pine" and insert --pipe-- therefor

In Column 6, Line 22, in Claim 14, delete "pine" and insert --pipe-- therefor

In Column 6, Line 46, in Claim 20, after "assembly", delete "is"

In Column 6, Line 54, in Claim 22, after "scanning of", insert --a--

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*